United States Patent
Amrani et al.

(10) Patent No.: US 7,053,591 B2
(45) Date of Patent: May 30, 2006

(54) POWER CONVERSION DEVICE WITH EFFICIENT OUTPUT CURRENT SENSING

(75) Inventors: Hafid Amrani, Marseilles (FR); Hubert Cordonnier, Marseilles (FR); Christian Dupuy, Peynier (FR)

(73) Assignee: Atmel Corporation, San Jose, CA (US)

( * ) Notice: Subject to any disclaimer, the term of this patent is extended or adjusted under 35 U.S.C. 154(b) by 41 days.

(21) Appl. No.: 10/969,827

(22) Filed: Oct. 20, 2004

(65) Prior Publication Data

US 2006/0002154 A1    Jan. 5, 2006

(30) Foreign Application Priority Data

Jul. 2, 2004   (FR) .................................. 04 07393

(51) Int. Cl.
*G05F 1/656* (2006.01)
*G05F 3/16* (2006.01)

(52) U.S. Cl. ...................... 323/222; 323/316; 327/561; 361/111

(58) Field of Classification Search ................ 323/222, 323/267, 312–316, 285; 327/561, 538; 361/111, 361/93.1, 93.9; 363/80, 89, 79
See application file for complete search history.

(56) References Cited

U.S. PATENT DOCUMENTS

| | | | |
|---|---|---|---|
| 4,021,701 A | * | 5/1977 | Davies ........................ 361/18 |
| 5,229,707 A | | 7/1993 | Szepesi et al. .............. 323/222 |
| 5,552,740 A | * | 9/1996 | Casper ........................ 327/541 |
| 5,757,635 A | * | 5/1998 | Seong .......................... 363/89 |
| 5,867,014 A | * | 2/1999 | Wrathall et al. ............. 323/316 |
| 6,229,291 B1 | * | 5/2001 | Matsumura et al. ........ 323/282 |
| 6,424,129 B1 | | 7/2002 | Lethellier ................... 323/272 |
| 6,492,793 B1 | | 12/2002 | Bentolila et al. ........... 323/282 |

FOREIGN PATENT DOCUMENTS

EP    1 052 748 A1    11/2000

* cited by examiner

*Primary Examiner*—Rajnikant B. Patel
(74) *Attorney, Agent, or Firm*—Schneck & Schneck; Thomas Schneck

(57) ABSTRACT

A power conversion device contains an electronic circuit for sensing an output current characteristic of an output drive device. The characteristic of the current through the output drive device is sensed and communicated to a switching device for controlling a sensing current. The switching device is coupled to the output drive device and senses the output current of the output drive device. The switching device produces a sensing current proportional to the sensed output current. An internal resistance device is used for producing a sensing voltage. The internal resistance device is coupled with the switching device and receives the sensing current. The internal resistance device provides the sensing voltage from the sensing current proportional to the current through the output drive device.

23 Claims, 3 Drawing Sheets

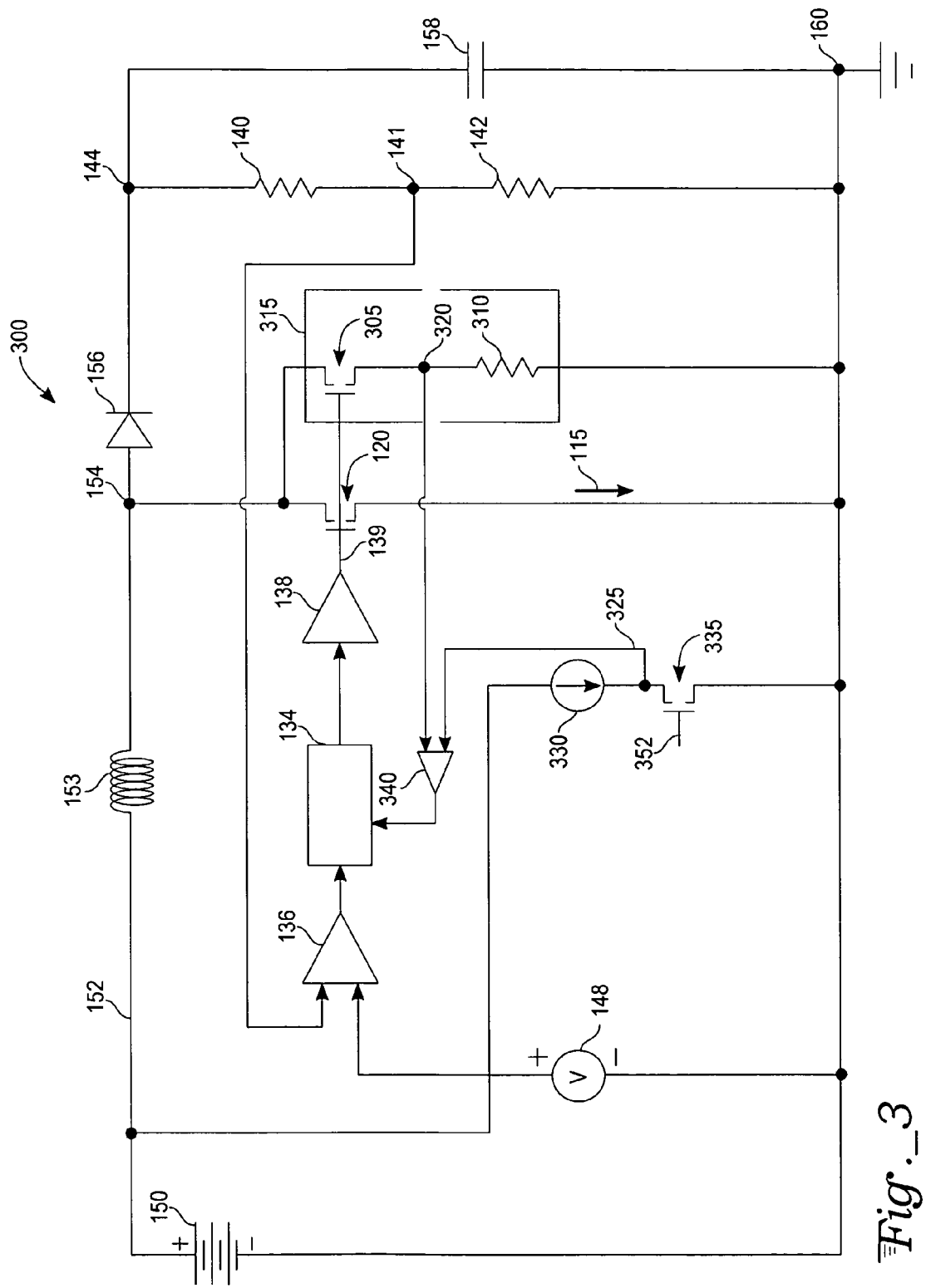
Fig._3

POWER CONVERSION DEVICE WITH EFFICIENT OUTPUT CURRENT SENSING

TECHNICAL FIELD

The present invention relates to DC-to-DC switching regulators, linear regulators, and power amplifiers. More specifically, an apparatus for sensing and maintaining an output drive characteristic of these circuits also provides for protection of the output devices.

BACKGROUND ART

DC-to-DC power converters are used in a wide variety of products. They are key in the areas of renewable energy resources (solar cells), products requiring alternative voltages (liquid crystal displays), remote powered communications networks (remote cell phone repeater stations), and battery powered devices such as cellular phones and laptop computers.

DC-to-DC converters, battery chargers, audio amplifiers, and power regulators require a way of sensing an output current. Feedback based on the output current can regulate sourcing circuitry to maintain a steady output characteristic and protect output circuitry from an overload current.

Typically, a resistor has been used inline with an output node and configured to develop a sensing voltage across it. Sensed current or voltage quantities may be compared with internal reference sources and combined within digital circuitry to provide controlling signals to output drive devices. A comparison and feedback path allows output current and voltage to be maintained across varying environmental conditions such as characteristics of load demand, temperature, source voltage, and implementation technologies. A drawback of this approach to circuit characteristic sensing is the significant amount of current required, as much as 1 amp in certain implementations, which reduces the efficiency of the converter or regulating device proportionately. Furthermore, a precision external resistor is expensive and difficult to integrate.

With regard to FIG. 1, exemplifying a prior art device, a feedback signal is formed, within a DC-to-DC converter 100, through comparing and combining sensed output characteristics with reference sources. A first modifying feedback signal is produced at an output of a first comparator 130. A first input node of the first comparator 130 is supplied with a first sense voltage from an output node 125 of an NMOS drive transistor 120. A second input node of the first comparator 130 is supplied with a voltage output from a first voltage reference source 132. A second modifying signal is produced at an output of a second comparator 136 supplied with an output voltage characteristic from a voltage divider node 141 and a voltage output from a second voltage reference source 148. The two modifying signals are combined within a digital circuit 134 with the combined signals supplied as feedback to a driver 138. An output 139 of the driver 138 produces a drive level control signal. The drive level control signal produces a regulated drive level at the output node 125 of the drive transistor 120.

In further regard to FIG. 1, an internal or external sense resistor 105 conducts a sense current 115 coming from the output node 125. The sense current 115 flowing through the external sense resistor 105, creates the first sense voltage which is input to the first comparator 130. The voltage divider node 141 connects a first internal resistor 140 to a second internal resistor 142 forming a series combination. An input to the first internal resistor 140 is connected to a converter output node 144 and an output of the second internal resistor 142 is connected to a ground 160. A second input of the second comparator 136 is from an output of the second voltage reference source 148. The voltage output from the voltage divider node 141 is a second sense voltage measuring a characteristic of a voltage output from the converter output node 144. The second sense voltage is compared within the second comparator 136 with a voltage output from the reference voltage source 148.

Sourcing and biasing devices connect to the DC-to-DC converter 100 for operation. A battery 150 producing a source voltage $V_{in}$, is a power source of the externally sensed DC-to-DC converter 100. The battery 150 is connected to an input node 152 and to an input of an inductor 153. An output of the inductor 153 connects to a sensing node 154. An electrical rectifying device, a diode 156, is connected at an anode to the sensing node 154 and at a cathode to the converter output node 144. The diode 156 provides an electrical isolation of the sensing node 154 from any occurrence of a voltage at the converter output node 144 exceeding a potential greater than a diode device threshold below the sensing node 154. An electrical charge storage device, a capacitor 158, is connected at an input to the converter output node 144 and at an output to ground 160.

With regard to FIG. 2, also a prior art device, a current mirror sensed DC-to-DC converter 200 contains an internal sense resistor 205 connected at an input to the sensing node 154 and at an output to a first input of an NMOS current mirror transistor 215. A sense voltage of about 100 millivolts across sense resistor 205 and a mirror current of about 100 microamperes are targeted. A value for the internal sense resistor 205 is typically 1 kilohms. The current mirror transistor 215 is connected at an output to ground 160 and is connected at a second input, or gate input, to the output 139 of the driver 138. The series connection of current mirror transistor 215 with the internal sense resistor 205 forms a current mirror. An input to the internal sense resistor 205 is connected in parallel to a first input of the drive transistor 120 and a control input to the current mirror transistor 215 is connected in parallel to a control input or second input of the drive transistor 120. The configuration of the internal sense resistor 205 and the current mirror transistor 215 in parallel with drive transistor 120 allows the current mirror to track the drive characteristics of the current through the drive transistor 120 and to produce a sense current $I_{sense/k}$ 225 through internal sense resistor 205 which reflects the characteristics of $I_{sense}$ 115 at a fraction of the magnitude of current. A first sense voltage, $V_{senseMn/k}$, is the voltage at the output of internal sense resistor 205, which is input to a first input of a voltage referenced comparator 210. A second input to the voltage-referenced comparator 210 is the voltage at the sensing node 154. An output of the voltage-referenced comparator 210 is connected to the digital circuit 134.

The value of the internal sense resistor 205 and the current determining device geometries of the current mirror transistor 215 are configured to produce the sense current $I_{sense/k}$ 225 with a magnitude that is a fraction of $I_{sense}$ 115 such that the ratio of $I_{sense/k}$ 225 to $I_{sense}$ 115 is 1-to-k or $I_{sense/k}$ 225 is $1/k^{th}$ of $I_{sense}$ 115. A value of "k" is chosen to keep the 1/k ratio small and to not detract from power efficiency. A typical value for "k" is about 1000. For example, when a maximum value expected for $I_{sense}$ 115 is 100 milliamperes a 1 kilohm internal sense resistor 205 is chosen to produce an $I_{sense/k}$ 225 of 100 microamperes. Therefore the current mirror formed by the internal sense resistor 205 and the current mirror transistor 215, produces the first sense voltage, $V_{senseMn/k}$, using $1/k^{th}$ the magnitude of current of $I_{sense}$ 115. The current $I_{sense/k}$ 225, conducted through internal sense resistor 205, is a portion of a current that is sourced from the sensing node 154. The current sourced from the sensing node 154 also supplies $I_{sense}$ 115, but $I_{sense/k}$ 225 does not take current from $I_{sense}$ 115. The relatively low current magnitude of $I_{sense/k}$ 225 and the fact that it does not detract from $I_{sense}$ 115 means that a progressive step is gained in efficiency by the current mirror sensed DC-to-DC converter 200 over the externally sensed DC-to-DC converter 100.

A drawback to this technique is that the efficiency is improved as the magnitude of $I_{sense/k}$ 225 becomes smaller. But as $I_{sense/k}$ 225 becomes smaller, accuracy of the first sense voltage $V_{senseMn/k}$ degrades. Feedback signaling quantities based on $V_{senseMn/k}$, such as the drive level control signal at the output 139 of the driver 138, become less useful in producing an accurate drive level control as the circuit is configured for improved efficiency by a reduction in $I_{sense/k}$ 225.

A further drawback of the current mirror sensed DC-to-DC converter 200 is that the common mode voltage range is very wide, on the order of the magnitude of the output voltage. A comparator design for this type of signal characteristic needs a low input common mode voltage range and a high input common mode voltage range ability. For a CMOS implementation technology, the devices implementing the comparator are exposed to source-drain voltages large enough that they are subject to channel length modulation effects. A resultant non-linearity in device performance means an unfavorable device current variation over the operating range. Additional design considerations are thus required, such as current conveyors, which present design challenges and added costs that detract from the benefits gained in the current mirror approach.

What is needed is a power converter with a sensed signal proportional to a target sense current. Ideally, the sensed signal would be detected with no degradation in the efficiency of the converter, based on the linear region of operation of a target drive transistor, and be of a low common mode signal range for ease of comparator design. An ideal sense signal would also be produced without externally or internally added components that are complicated or costly in expense or die area of an implementation technology.

DISCLOSURE OF INVENTION

We have devised a power conversion device that produces a signal representing sensed circuit characteristics for developing feedback control signals to modify an output drive signal of devices such as regulators, converters, chargers, and amplifiers. The present invention produces a sensing voltage proportional to an output current conducted through an output drive transistor. The voltage measurement produced, reflecting a sensed current, is obtained without degrading an efficiency of a device incorporating it and without extra circuitry such as external resistors, large internal resistors, external low-pass filters, or current transformers. The lack of extra circuitry provides a savings in money and/or circuit area.

BRIEF DESCRIPTION OF DRAWINGS

FIG. 3 is a schematic diagram of an exemplary embodiment of the present invention for power output regulation.

MODES FOR CARRYING OUT THE INVENTION

Figure 1:
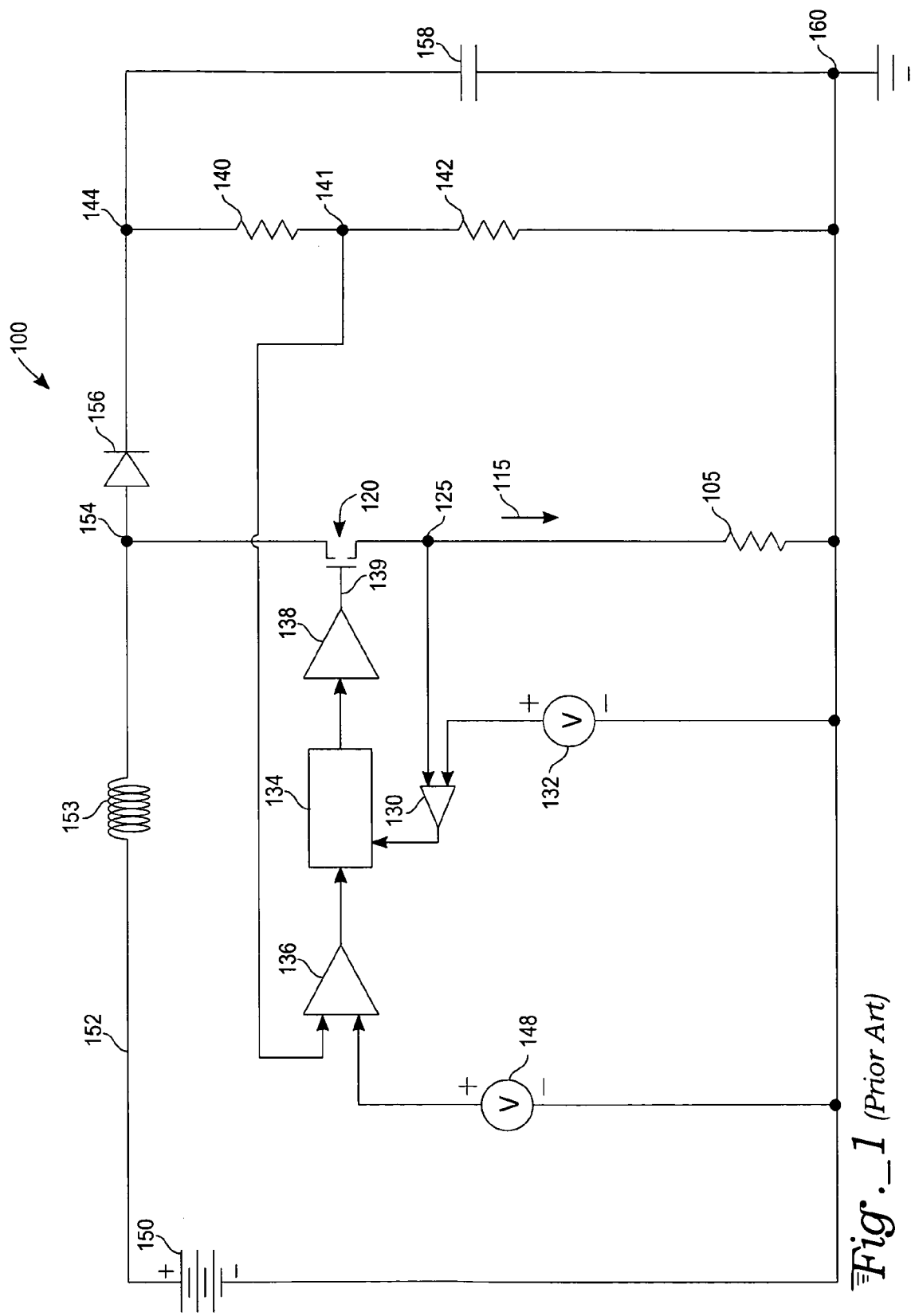
FIG. 1 is a schematic diagram of a prior art circuit incorporating current sensing by a conventional sensing resistor method.
Figure 2:
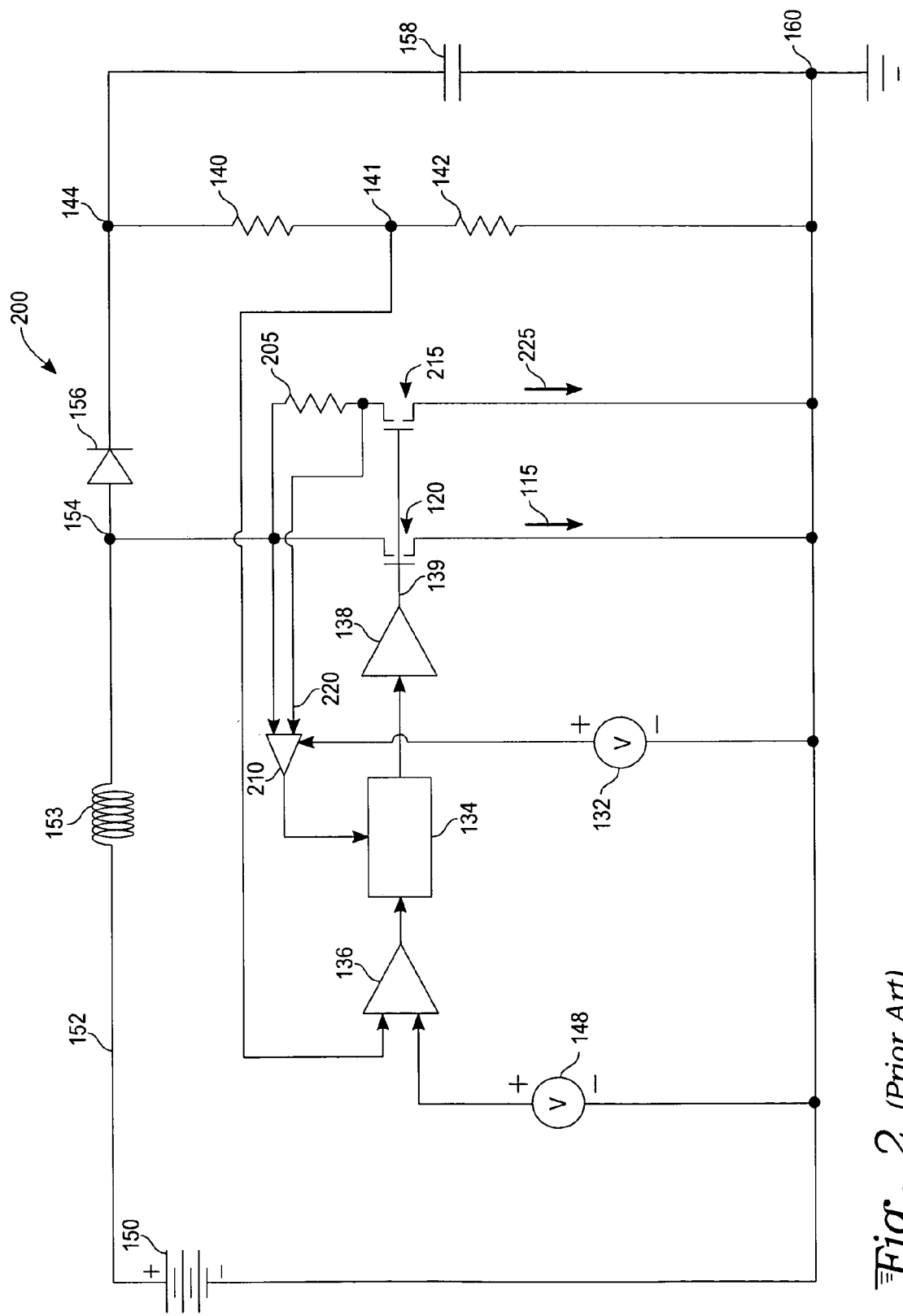
FIG. 2 is a schematic diagram of a prior art circuit incorporating a current mirror for sensing an output current and developing a regulating signal output.

With reference to FIG. 3, a DC-to-DC converter 300 contains an NMOS sense transistor 305 connected in series with a sense resistor 310 to form a voltage sensing circuit 315. The voltage sensing circuit 315 is connected in parallel to the drive transistor 120 such that a first input of the sense transistor 305 and a first input of the drive transistor 120 are connected to the sensing node 154. A second input or gate input of the sense transistor 305 and a second input or gate input of the drive transistor 120 are connected to the output 139 of the driver 138. Connected in parallel, sense transistor 305 tracks the operation of drive transistor 120, producing a sense current through the sense resistor 310 reflecting the output characteristics of drive transistor 120. The sense current through the sense resistor 310 produces a sense voltage $V_{sense}$ at node 320 that represents a drain-source voltage characteristic of drive transistor 120. $V_{sense}$ is used for comparison and feedback, described infra.

The value of the sense resistor 310 is on the order of 1 kilohm. The amount of current drawn through this resistance is about 50 microamperes, which does not detract significantly from the overall efficiency of the converter nor is the current through the sense resistor 310 taken from $I_{sense}$ 115. A 1 kilohm resistor, such as the sense resistor 310, takes a small area in silicon to implemented with a present day semiconductor fabrication technology. The sense resistor 310 of the present invention is an efficient use of die area for such a device and does not incur significant device cost.

With the input gates of the sense transistor 305 and the drive transistor 120 connected together, the transistors are on at the same time allowing the voltage sensing circuit 315 to be active when drive transistor 120 is on and to track its behavior. The size of the sense transistor 305 is large enough physical that its channel resistance when on, $R_{dson}$, is much less than the 1 kilohm magnitude of the sense resistor 310. A circuit designer in the art of semiconductor fabrication is able to craft a sense transistor 305 with gate geometry wide enough that the on-channel resistance is small (3–5 ohms) compared to the 1 kilohm value of the sense resistor 310. $V_{sense}$ is on the order of 50 millivolts for a contemporary semiconductor fabrication technology and nearly equal to the product of $I_{sense}$ 115 and an equivalent on-channel resistance $R_{dson}$ of the drive transistor 120. This ensures that the sense voltage, $V_{sense}$, at voltage sense node 320, is nearly equal to the source-drain voltage of the drive transistor 120. A typical value for $V_{sense}$ in a contemporary semiconductor fabrication technology would be about 50 millivolts. The source-drain voltage of the drive transistor 120 is the voltage at the sensing node 154. $V_{sense}$ therefore, is a measure of the voltage at the sensing node 154 and is produced without taking any current from $I_{sense}$ 115. $V_{sense}$ is nearly equal to the voltage at the sensing node 154 and in practice would be within approximately 0.5% of the voltage at the sensing node 154.

When drive transistor 120 is off, the sense transistor 305 is off as well, meaning that with no current flowing through the sense resistor 310, the sense node voltage $V_{sense}$ goes to zero. $V_{sense}$ is a low common mode voltage range signal that is provided to an input of a low common mode comparator 340 for controlling an output current limitation.

A second input to the comparator 340 is connected to a reference voltage source node 325, where a reference voltage, $V_{ref}$, is produced. $V_{ref}$ is produced by a reference current source 330 producing a reference current $I_{ref}$ flowing into an NMOS reference transistor 335. A value for the reference current $I_{ref}$ would be about 10 microamperes in typical practice. A gate input 352 of the reference transistor 335 is connected to the input node 152 and receives the voltage $V_{in}$ from the battery 150. $V_{sense}$ is a measure of $I_{sense}$ and is compared with $V_{ref}$ to produce a third modifying signal at an output to comparator 340. The third modifying signal is combined with the second modifying signal produced at the output of the second comparator 136. The combined modifying signals produce the drive level control signal at output 139. Through this feedback path, $V_{sense}$ is a measure of a sensed drive current characteristic producing a drive level control signal.

With a small source-drain voltage across it, the reference transistor 335 is configured to operate in a non-saturation region. Therefore, the output reference voltage, $V_{ref}$, at node 325 can be calculated by an expression:

$$V_{ref} = \frac{I_{ref} \cdot L_r}{\mu_n \cdot C_{ox} \cdot W_r \cdot (V_{in} - V_{Tn})}$$

where $W_r$ and $L_r$ are the width and length respectively of the gate of the reference transistor 335. For the NMOS reference transistor 335, produced in an integrated circuit fabrication technology, $\mu_n$ is the mobility of carriers of an n-type semiconductor, $C_{ox}$ is the oxide capacitance beneath a gate of the device, and $V_{Tn}$ is a device threshold voltage. When drive transistor 120 is on, due to a small source-drain voltage configuration, it is also in a non-saturated region of operation. $V_{sense}$ is nearly equal to the source-drain voltage of drive transistor 120. An expression for $V_{sense}$ is:

$$V_{sense} = \frac{I_{sense} \cdot L_n}{\mu_n \cdot C_{ox} \cdot W_n \cdot (V_{in} - V_{Tn})}$$

where $W_n$ and $L_n$ are the width and length respectively of the gate of the drive transistor 120.

A maximum output current limitation value is obtained when $V_{sense}$ and $V_{ref}$ are equal. This is given by:

$$I_{lim} = I_{ref} \cdot \frac{W_n}{W_r} \cdot \frac{L_r}{L_n}$$

The current limitation value is directly proportional to a magnitude of $I_{ref}$ and a ratio of the ratios of the width to length of the gate geometries of the drive transistor 120 and the reference transistor 335 respectively. An advantage of this characteristic of the present invention is that the current limitation value does not depend on nor is it degraded by any non-linearity of the $R_{dson}$ of drive transistor 120. This method compensates for the significant variation of the $R_{dson}$ of the drive transistor 120 there may be due to the large variation in $\mu_n$, $C_{ox}$, and $V_{Tn}$ across an operating temperature and a fabrication process.

Although the present invention has been described in terms of exemplary embodiments, one skilled in the art will recognize that additional embodiments could readily be conceived which are still within a scope of the present invention. For example, a particular output drive device or a specific electronic device making use of sensed current regulation is presented as an exemplary embodiment of approaches for implementing the present sensing technique. However, a skilled artisan could readily adapt the present technique of sensing an output current to the characteristics of a bipolar junction transistor, junction field effect transistor, or insulated gate bipolar transistor and accomplish the same current switching and sensing results. A skilled artisan might employ alternative reference voltage generators and/or voltage regulation means for a sense voltage reference source. Such alternatives may come from such embodiments as a series combination of load devices between appropriate voltage busses composed of enhancement mode or depletion mode configurations of NMOS or PMOS transistors.

Alternatively, reverse biased zener diodes may be used for a voltage reference means and achieve the same voltage reference source generation result. Alternatively, one could implement voltage reference sourcing means by composing resistive elements from non-saturated NMOS load devices with a gate coupled to a drain.

What is claimed is:

1. A power conversion device comprising:
   a means for sensing an output current of an output drive device;
   a means for sensing an output voltage, said sensed output current and said sensed output voltage configured to form a plurality of sensed output signals;
   a means for producing a plurality of voltage reference sources;
   a means for comparing said plurality of sensed output signals with said plurality of voltage reference sources to produce a plurality of modifying signals, said means for comparing coupled to an output of said means for sensing an output current and coupled to an output of said means for sensing an output voltage;
   a means for combining said plurality of modifying signals, said means for combining coupled to an output of said plurality of means for comparing;
   a means for producing an output drive control signal from said combined plurality of modifying signals, said means for producing an output coupled to an output of said means for combining; and
   a means for producing a regulated output drive level from said output drive control signal, said output drive control signal configured as a feedback of said sensed output current and said sensed output voltage to regulate said output drive level of said output drive device, said sensed output current configured as a first component of said feedback compared with a first one of said plurality of voltage reference sources to produce a first one of said plurality of modifying signals, said sensed output voltage configured as a second component of said feedback compared with a second one of said plurality of voltage reference sources, the first one of said plurality of modifying signals and the second one of said plurality of modifying signals combine to produce said output drive control signal.

2. The power conversion device of claim 1, wherein said means for sensing said output current further comprises:
   a signaling means for communicating an output signal indicative of said sensed output current;
   a first switching means for controlling a sensing current; and an internal resistive means for producing a sensing voltage signal from said sensing current, said internal resistive means configured to provide said sensing voltage at a magnitude proportional to an output current sensed from an output drive device, said sensing voltage is a measure of said sensed output current.

3. The power conversion device of claim 2, wherein a first input node of said first switching means is coupled to a first input node of said output drive device, a second input node of said first switching means is coupled to a second input node of said output drive device, and said first switching means is configured to sense the operation of said output drive device for supplying said signaling means with said signal of said sensed output current.

4. The power conversion device of claim 2, wherein said first switching means is coupled with said internal resistive means for providing a magnitude of said sensing current to said internal resistive means proportional to an output current flowing through said output drive device, said sensing current passing through said internal resistive means producing said sensing voltage signal.

5. The power conversion device of claim 2, wherein a resistance of said switching means and a resistance of said internal resistive means are configured such that a voltage across said internal resistive means is about equal to a voltage across said output drive device.

6. The power conversion device of claim 2, wherein a magnitude of said sensing current is sufficiently small compared with the current through said output drive device such that an efficiency of said power conversion device is not diminished by said output current sensing means.

7. The power conversion device of claim 2, wherein said sensed output current is of a low common mode voltage range, said sensed output current capable of detection and manipulation by a low common mode voltage range comparison device.

8. The power conversion device of claim 2, wherein one of said means for producing a plurality of voltage reference sources is a current reference source coupled with a second switching means, said second switching means configured to receive a current from said current reference source, said second switching means configured to control a flow of a current from said current reference through said second switching means, said flow of current through said second switching means configured to produce a first voltage reference source at an output to said second switching means.

9. The power conversion device of claim 2, wherein one of said means for comparing and producing a modifying signal is configured to compare said first voltage reference source with said sensing voltage signal to produce a first current modifying signal.

10. The power conversion device of claim 9, wherein said electronic device for power conversion is fabricated as a portion of a semiconductor chip, said electronic device comprising a plurality of transistor devices, said first current modifying signal is independent of any variation in an operating temperature, a mobility of electronic carriers, a gate oxide thickness, or a device threshold of said plurality of transistors.

11. The power conversion device of claim 10, wherein a limitation of said sensing current is proportional to a multiplicative product of a magnitude of current of said current reference and a ratio of a plurality of device geometries of said first switching means and said second switching means.

12. A power conversion device comprising:
an output current sensing circuit configured to sense an output current of an output drive transistor and produce an output signal for communicating a characteristic of said sensed output current of said output drive transistor;
a voltage divider configured to produce a sensed output voltage, said sensed output current and said sensed output voltage combined to form a plurality of sensed output signals;
a plurality of voltage reference sources;
a plurality of voltage comparators, said plurality of voltage comparators coupled to an output of said plurality of voltage reference sources and to said plurality of sensed output signals, said plurality of voltage comparators is further configured to compare said plurality of sensed output signals with said plurality of voltage reference sources to produce a plurality of modifying signals;
a combinatorial digital circuit coupled to said plurality of voltage comparators and configured to combine said plurality of modifying signals at an output of said combinatorial digital circuit, said combination of said plurality of modifying signals configured as an output drive control signal;
an output drive transistor coupled to said output of said combinatorial digital circuit and configured to regulate an output drive level from said output drive control signal.

13. The power conversion device of claim 12, wherein said output current sensing circuit further comprises:
a first sense transistor configured to modify a sense current, said first sense transistor coupled to said output drive transistor and configured to sense an output current through said output drive transistor and produce a sense current as an output, said sense current modified in proportion to variations in said output current sensed; and
an internal sense resistor coupled to said first sense transistor, said internal sense resistor configured to receive said modified sense current from said first sense transistor, said modified sense current flowing through said internal sense resistor producing a sensing voltage signal, said sensing voltage signal being proportional to said output current sensed flowing through said output drive transistor and communicating said characteristic of said sensed output current.

14. The power conversion device of claim 13, wherein a first input node of said first sense transistor is coupled to a first input node of said output drive transistor, a second input node of said first sense transistor is coupled to a second input node of said output drive transistor, and said first sense transistor is configured to sense the operation of said output drive transistor for supplying said output signal of said sensed output current.

15. The power conversion device of claim 13, wherein said first sense transistor is coupled with said internal sense resistor for providing a magnitude of said sensing current to said internal sense resistor proportional to an output current flowing through said output drive transistor, said sensing current passing through said internal sense resistor producing said sensing voltage signal.

16. The power conversion device of claim 13, wherein a resistance of said first sense transistor and a resistance of said internal sense resistor are configured such that a voltage across said internal sense resistor is about equal to a voltage across said output drive transistor.

17. The power conversion device of claim 13, wherein a magnitude of said sensing current is sufficiently small compared with the current through said output drive transistor such that an efficiency of said power conversion device is not diminished by said output current sensing circuit.

18. The power conversion device of claim 13, wherein said sensed output current is of a low common mode voltage range, said sensed output current capable of detection and manipulation by a low common mode voltage range comparison device.

19. The power conversion device of claim 13, wherein one of said plurality of voltage reference sources is a current reference source coupled with a second transistor, said second transistor configured to receive a current from said current reference source, said second transistor configured to control a flow of a current from said current reference through said second transistor, said flow of current through said second transistor configured to produce a first voltage reference source at an output to said second transistor.

20. The power conversion device of claim 13, wherein one of said voltage comparators is configured to compare said first voltage reference source with said sensing voltage signal to produce a first current modifying signal.

21. The power conversion device of claim 20, wherein said electronic device for power conversion is fabricated as a portion of a semiconductor chip, said electronic device comprising a plurality of transistor devices, said first current modifying signal is independent of any variation in an operating temperature, a mobility of electronic carriers, a gate oxide thickness, or a device threshold of said plurality of transistors.

22. The power conversion device of claim 21, wherein a limitation of said sensing current is proportional to a multiplicative product of a magnitude of current of said current reference and a ratio of a plurality of device geometries of said first sense transistor and said second transistor.

23. A method of sensing an output current of an output drive device and regulating an output drive current through said output drive device of a power conversion device comprising:
   sensing an output current of said output drive device to produce a signal of a sensed output current;
   sensing an output voltage to produce a signal of a sensed output voltage, said signal of a sensed output current and said signal of a sensed output voltage configured to form a plurality of sensed output signals;
   producing a plurality of voltage reference sources;
   comparing said plurality of sensed output signals with said plurality of voltage reference sources to produce a plurality of modifying signals;
   combining said plurality of modifying signals;
   producing an output drive control signal from said combined plurality of modifying signals, said output drive control signal configured to be used as a feedback of said signal of a sensed output current and said signal of a sensed output voltage, said signal of a sensed output current compared with a first one of said plurality of voltage reference sources configured as a first component of said feedback, said signal of a sensed output voltage compared with a second one of said plurality of voltage reference sources configured as a second component of said feedback, said first component of said feedback and said second component of said feedback combine to produce said output drive control signal; and
   producing a regulated output drive level from said output drive control signal.

* * * * *